United States Patent
Zhang (10) Patent No.: US 6,465,766 B1
(45) Date of Patent: Oct. 15, 2002

(54) SUNLIGHT TRACKING SENSOR AND ITS USE IN FULL-AUTOMATIC SOLAR TRACKING AND COLLECTING DEVICE

(76) Inventor: Yaoming Zhang, Nanjing Fiber Glass Research and Design Institute, No. 30, Andeli, West Yuhua Road, Nanjing, 210012, P.R. (CN)

( * ) Notice: Subject to any disclaimer, the term of this patent is extended or adjusted under 35 U.S.C. 154(b) by 0 days.

(21) Appl. No.: 09/570,643

(22) Filed: May 15, 2000

(30) Foreign Application Priority Data

May 19, 1999 (CN) .......................................... 99114216 A
Nov. 5, 1999 (CN) .......................................... 99114530 A (51) Int. Cl.⁷ .............................................. G01C 21/00
(52) U.S. Cl. ................................. 250/203.4; 250/203.7
(58) Field of Search ........................... 250/203.4, 203.3, 250/203.5, 201.9, 201.2, 203.7; 244/3.14, 3.24

(56) References Cited

U.S. PATENT DOCUMENTS

| | | | | |
|---|---|---|---|---|
| 3,305,686 A | * | 2/1967 | Etal ............................. | 250/203 |
| 4,006,356 A | * | 2/1977 | Johnson et al. ......... | 250/203 R |
| 4,159,419 A | * | 6/1979 | Wittke ........................ | 250/203 |
| 4,649,900 A | * | 3/1987 | Trihey ........................ | 126/425 |
| 5,117,744 A | * | 6/1992 | Zimmer et al. ............... | 454/75 |
| 5,798,517 A | * | 8/1998 | Berger ..................... | 250/203.4 |

* cited by examiner

Primary Examiner—Robert H. Kim
Assistant Examiner—Hoon K. Song
(74) Attorney, Agent, or Firm—Jenkens & Gilchrist

(57) ABSTRACT

A sunlight tracking sensor has light sensing faces for receiving light signals from all directions. The light sensing faces are arranged in four quadrants. Each quadrant of the light sensor can sense light signals in two coordinate axes direction. The light signals are processed and used to adjust a light collecting device to track light from the sun.

25 Claims, 8 Drawing Sheets

SUNLIGHT TRACKING SENSOR AND ITS USE IN FULL-AUTOMATIC SOLAR TRACKING AND COLLECTING DEVICE

CROSS REFERENCE TO RELATED APPLICATIONS

The application claims priority to Chinese Application Serial No. 99114216.0, filed on May 19, 1999, and Chinese Application Serial No. 99114530.5, filed on Nov. 5, 1999.

FIELD OF THE INVENTION

The invention relates to the sunlight application technology, and in particular, to a sunlight tracking sensor and its use in a light collecting device which can follow the sun fully automatically.

BACKGROUND OF THE INVENTION

Sunlight is an inexhaustible energy source in nature. However, so far the use of sunlight by mankind has remained basically at a primary stage of natural lighting, e.g. indoor lighting by using direct sunshine through windows or skylights. Nevertheless, for some dwellings in densified residential areas and buildings such as underground shopping centers, direct solar rays cannot radiate into the buildings at daytime. In fact, the effective collection and rational utilization of sunlight are of great significance and have good prospects. For example, the direct and effective collection and utilization of sunlight can not only be used as a common indoor lighting means, but also be used for lighting those places requiring illumination with higher safety, such as dangerous articles storage, coal mines, tunnels and underwater operation.

To achieve the above-mentioned goals, the existing solutions generally contain a sunlight focusing unit, a driving unit, a light-transmitting unit, feedback control circuits and sunlight tracking sensors. In order to collect sunlight with high efficiency, the sunlight collecting device should be made to follow the apparent movement of the sun and to be always aligned directly with the solar rays. To meet this need, various sunlight tracking sensors based on different operation principles have emerged. For example, Chinese patent CN95107312.5 under the name "Sunlight Collecting Device and Sunlight Collection Control Device for Controlling Such Collecting Device", applied by Sanyo Electric Machinery Co. Ltd of Japan disclosed a light collecting device in which one or more light collection prisms are mounted in a collecting component at specified spaces and in a free-rotating manner, and a light collection control device comprising a solar position detector, a central processing device formed of an operation and a memory device such as a microprocessor and an optical axis sensor. The sunlight tracking device in this application detects the sun altitude using the optical axis sensor on the principle of imaging through an aperture and, after the processing by the central processing circuits, makes the light collecting device follow the sun automatically by means of the driving unit. However, the construction of the sensing, detecting and processing functions in this solution are complicated and costly, thus not widely used.

Figure 15:
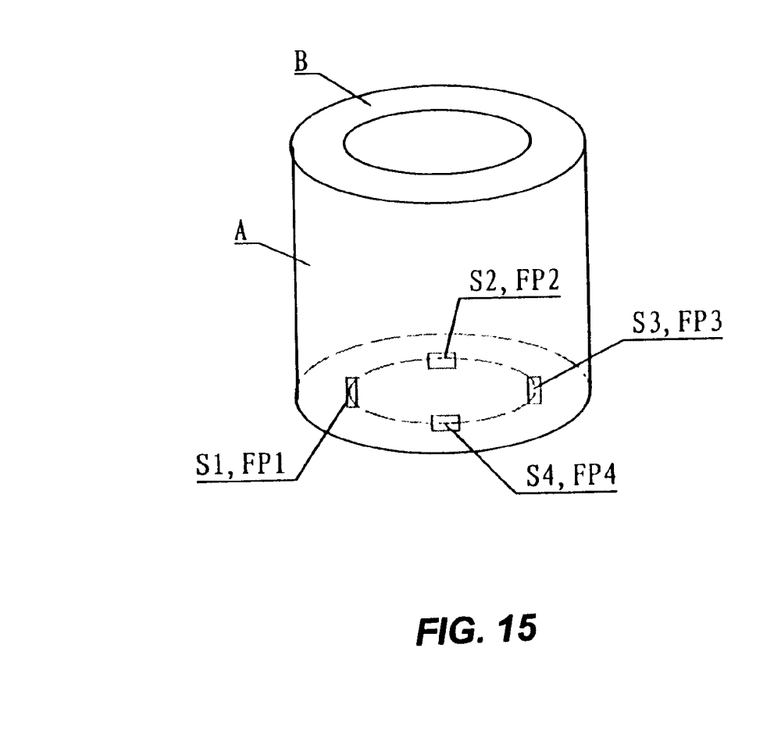
FIG. 15 is a schematic view showing the construction of the sensor by an existing technique.

Another previous patent is Japanese Kokai Tokkyo Koho JP7-43599 under the name "Sunlight Tracking Sensor", the construction of which is as shown in FIG. 15. Sensors S are provided in a sunlight collecting device. One or more optical fibers FP with light-absorbing layer are provided on the whole light-receiving plane of such a sensor. The sunlight collecting device comprises an opaque cylinder A, and at the upper end of the cylinder A, there is an opaque circular cover B having a central hole. The sensors are disposed at the lower end of the cylinder A at symmetric positions equal to the inner diameter of the circular cover B.

Figure 16:
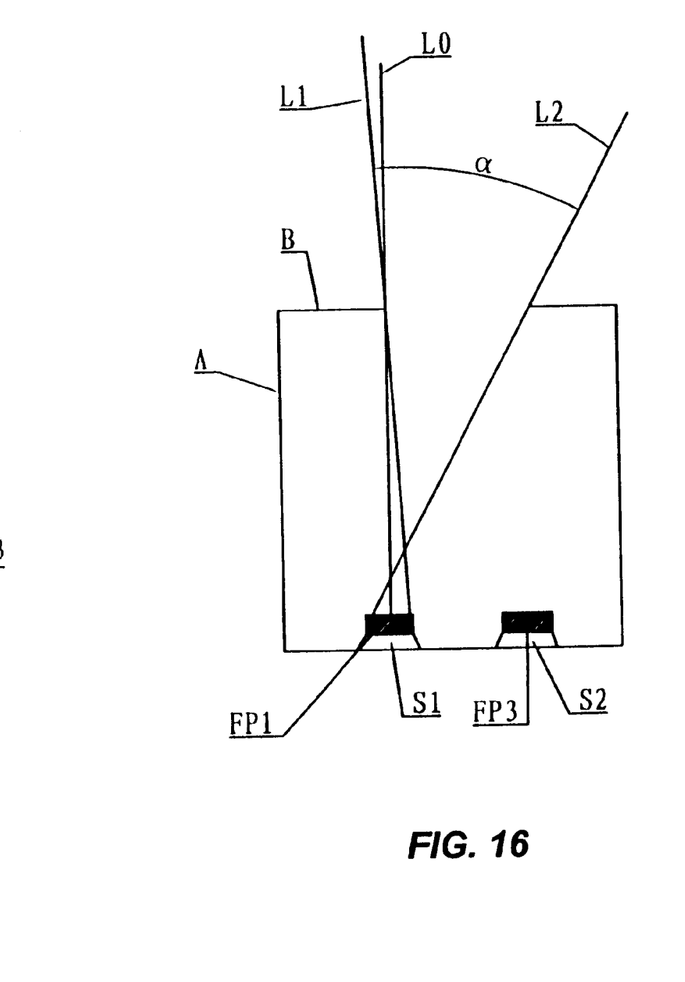
FIG. 16 is a view showing the operating principle of the sensor by an existing technique.

The operating principle of these sensors and light collecting devices are illustrated in FIG. 16. L represents fictitious rays falling vertically from the hole edge of the opaque cover B down to the lower end of the cylinder A. Sunlight sensors S are disposed symmetrically along the circumference of these fictitious rays. The light signals received by each sensor S and the sensor at the corresponding position are processed by a circuit for comparison and amplification, and then the sunlight collecting device is driven to rotate to keep following the sun with high accuracy. This principle of detecting sunlight has a very obvious shortcoming. The device has only several light-receiving spots but not an all-directional light-receiving plane. Therefore, there must be blind zones in light receiving, and it is impossible to have all around, complete and accurate detection of sunlight. To sum up, the above-mentioned sensors have difficulty in making the light collecting device track the sun in all directions, thus resulting in less utilization of sunlight.

SUMMARY OF THE INVENTION

In view of the shortcomings of existing techniques, the present invention provides a sunlight tracking sensor, whose light sensing faces receive light signals in all directions, thus virtually eliminating blind zones in light receiving. In addition, the light sensing faces in each quadrant of the sensor can sense light signal components in the directions of two coordinate axes (FIG. 1), and after comparison and amplification of light signals by the circuits corresponding to the two groups of output ends, the light collecting device is driven to follow the sun correctly so that the accuracy of sunlight tracking is significantly increased.

The present invention also provides a sunlight collecting device which follows the sun fully automatically by using the above-mentioned sensor for collecting sunlight for illumination. By use of the high-accuracy sensor of this invention,. the sunlight collecting device is ensured to track sunlight with high accuracy and hence achieve higher sunlight utilization efficiency.

DESCRIPTION OF THE EMBODIMENTS OF THE INVENTION

Figure 3:
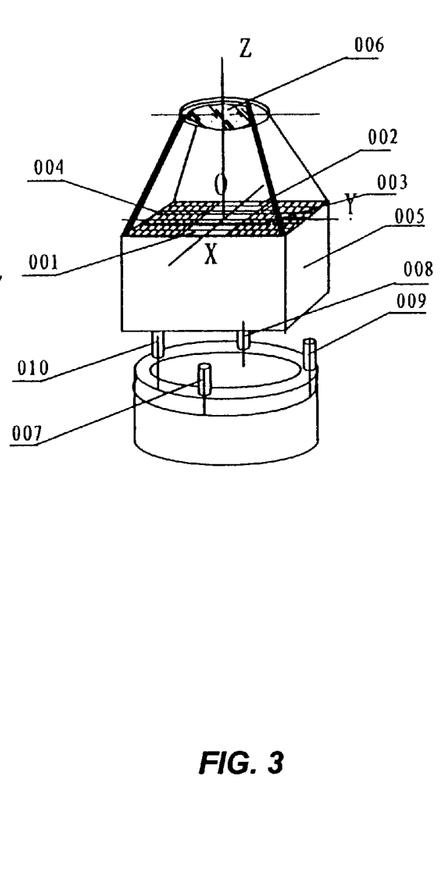
FIG. 3 is a schematic view showing the construction of the first embodiment of the sensor of the present invention.

To fulfil the first mentioned object, the sunlight tracking sensor in the embodiments of the present invention comprises a light signal receiver and its fixing device. The light signal receiver comprises input ends and output ends. Axis Z is the central axis of the fixing device. The input ends are formed of light sensing elements, and the light sensing faces of the light sensing elements of the light signal receiver can be distributed in four quadrants of the XOY plane of the fixing device to form a closed ring. The output ends of the light signal receiver can be set in four groups, corresponding to which four groups of light sensing faces of the light sensing elements are respectively distributed in the following four zones: the two quadrants where X is positive (001), the two quadrants where X is negative (002), the two quadrants where Y is positive (003) and the two quadrants where Y is negative (004). The four groups of light sensing faces in the four zones respectively sense the light signal components in the directions of the coordinate axes in the corresponding zones. The light sensing faces arranged in each quadrant separately belong to two groups of light sensing faces contained in two adjacent zones. To detect the direction of incident solar rays and concentrate the light energy a light focusing element is provided in front of the light sensing faces (FIG. 3).

Furthermore, to fulfil the object of collecting sunlight for illumination, a sunlight collecting device which follows the sun fully automatically provided by the present invention comprises a focusing collector which is rotated by a mechanical drive and controlled by light signal feedback control circuits. The focusing collector is rotated around the axes of two crossing shafts, a main shaft and an auxiliary shaft. On the focusing collector a sunlight tracking sensor is provided with its axis Z being parallel with a central axis of the focusing collector, and the auxiliary shaft is kept parallel with one of the coordinate axes X and y of the sensor. When the convergent light spot through the focusing element of the sensor falls just at the intersection point O between axes X and Y, the focusing collector is just directed at the sun.

Figure 1:
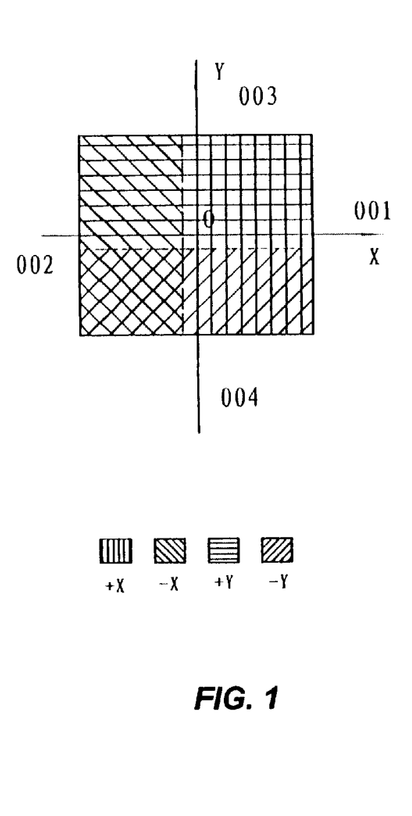
FIG. 1 is a schematic view showing the distribution of light sensing faces in the four quadrants of the sensor of the present invention.

The light sensing faces of the light sensing elements of the sensor distributed in four quadrants as shown in FIG. 1, i.e. quadrant I (X~Y), quadrant II (−X~Y), quadrant III (−X~−Y) and quadrant IV (X~−Y), forming four zones (001, 002, 003 and 004). In FIG. 1, the lines in different directions corresponding to different zones represent different groups of light sensing faces which can sense light signal components in the directions of the coordinate axes in the corresponding zones, and a total of four groups of light sensing faces are formed. As stated above, the four groups of light sensing faces in four zones respectively sense light signal components in the directions of the coordinate axes in the corresponding zones. Therefore, the light sensing faces in each quadrant separately belong to two groups of light sensing faces contained in two adjacent zones and sense light: signal components in the directions of two coordinate axes. For example, quadrant I defined by axes X~Y contains light sensing faces represented by vertical lines which can sense light signal component in the direction of the axis +X and those represented by horizontal lines which. can sense light signal component in the direction of the axis +Y, i.e. two portions of light sensing faces coexist in quadrant I. Meanwhile, the light sensing faces able to sense light signal component in the direction of the axis +X are all located in zone 001, while those able to sense light signal component in the direction the of axis +Y are all located in zone 003. When a beam of light radiates into a quadrant at the input ends of the light signal receiver, it is received by two portions of the light sensing faces coexisting in the quadrant which are able to sense light signal components in the directions of the two coordinate axes. These two portions of light sensing faces separately belong to two groups of light sensing faces contained in two adjacent zones, and the light signals received by them are emitted through two groups of output ends to the feedback control circuits for comparison and amplification to rotate the light focusing collector until it is aligned with the incident rays of the sun. If the light sensing faces are not distributed in the above described way, although sun tracking is still possible, the driving motors for the main and auxiliary shafts have to operate in turn repeatedly so that the time of adjusting and tracking is unreasonably prolonged.

Figure 2:
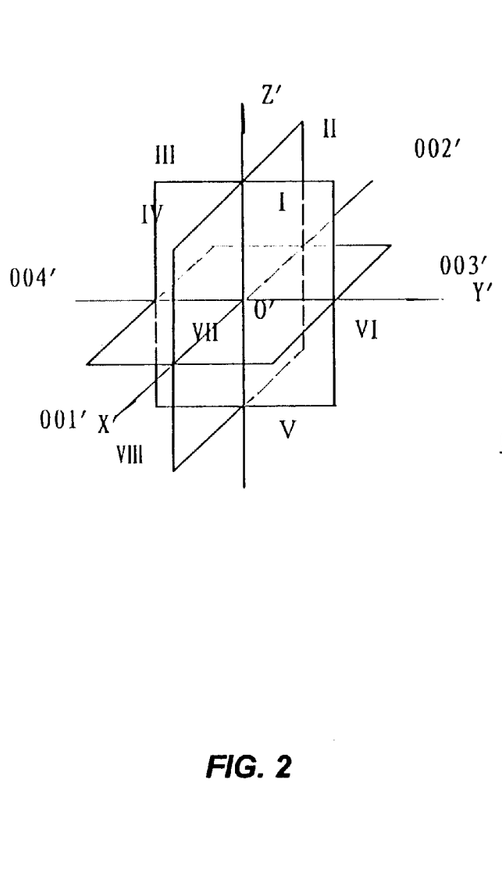
FIG. 2 is a schematic view showing eight octants of light sensing faces distribution of the sensor of the present invention.

In order to enable a wider light sensing range for the light signal receiver, another set of light sensing elements may be added to the portions of the former set of light sensing elements as stated above according to the above sensor principle, the sensing faces of which are distributed in eight octants of the 3D space formed by orthogonal axes X', Y' and Z', with the axis Z' as the central axis of the fixing device. X' and Y' are parallel with the corresponding X and Y axes. The output ends of the light signal receiver can be set in four groups corresponding to the four groups of sensing faces of the light sensing elements which are respectively distributed in the four zones: the four octants where X' is positive (001'), the four octants where X is negative (002'), the four octants where Y' is positive (003') and the four, octants where Y' is negative (004') (FIG. 2). The four groups of light sensing faces distributed in the four zones, respectively, sense light signal components in the directions of the coordinate axes in the corresponding zones. The light sensing faces distributed in each octant separately belong to two groups of light sensing faces contained in two adjacent zones. A total of four groups of output ends formed of two sets of light sensing elements are respectively connected with the corresponding control circuits.

Obviously, according to the distribution of the light sensing faces of the sensor of the present invention, there are essentially no blind zones in the light sensing faces of the sensor. The light sensing faces can receive solar rays from all directions to enable a wider range of light sensing by the sensor, thus increasing the accuracy of light signal receiving. Furthermore, the sensor of this invention can be positioned with greater freedom, either mounted at the central axis of the supporting frame of the focusing collector, or mounted at any position of the periphery of the focusing collector.

EMBODIMENT 1

FIG. 3 shows schematically the construction of the first embodiment of the sensor of the present invention. In this embodiment, the sensor has a fixing device 005, and axis Z which is parallel with the central axis of the focusing collector is the central axis of the fixing device. The light sensing plane of the sensor is formed from the end faces of optical fiber bundles. These end faces of the bundles are in a plane and are arranged in four zones 001, 002, 003 and 004 in the top end face of the fixing device 005 to form a closed ring. These four zones are formed in such a way that two orthogonal axes X and Y in the plane of this end face divide the plane into four quadrants, with the two quadrants where X is positive being zone 001, the two quadrants where X is negative being zone 002, the two quadrants where Y is positive being zone 003 and the two quadrants where Y is negative being zone 004. As shown in FIG. 1, a group of optical fiber bundles is regularly arranged in each zone. Each group of fiber bundles receives a light signal component in the direction of the coordinate axis in this zone, and each group of fiber bundles corresponds to a group of light signal output ends. Four such output end groups give four output signals by means of photosensitive elements 007, 008, 009 and 010 to the feedback control circuits. The above arrangement causes each quadrant to have two portions of light sensing faces of optical fiber bundles which can sense light signal components in the directions of two coordinate axes, with the light sensing faces belonging separately to two adjacent zones and coexisting in the same quadrant. This not only can avoid blind zones in light receiving when solar rays fall into the end face, but also increase the tracking accuracy. In order to detect the direction of incident solar rays and concentrate light energy, a focusing element 006 is provided above the plane of the input ends, with the light sensing faces of optical fiber bundles facing the focusing element 006.

This embodiment suits the adjustment of light incident angle in a small range. Namely, in case the angle between the incident solar rays and the central axis Z of the sensor is not large, when the focusing element 006 focuses the incident rays to produce a light spot down into a quadrant, the light spot is received by the light sensing faces of two portions of optical fiber bundles covered by the light spot. The light signals received by these two portions of fiber bundles are guided through to the two groups of output ends to the feedback control circuits and, after comparison and amplification, the light focusing collector is driven to rotate until the focusing collector is aligned with the incident rays.

EMBODIMENT 2

Figure 4:
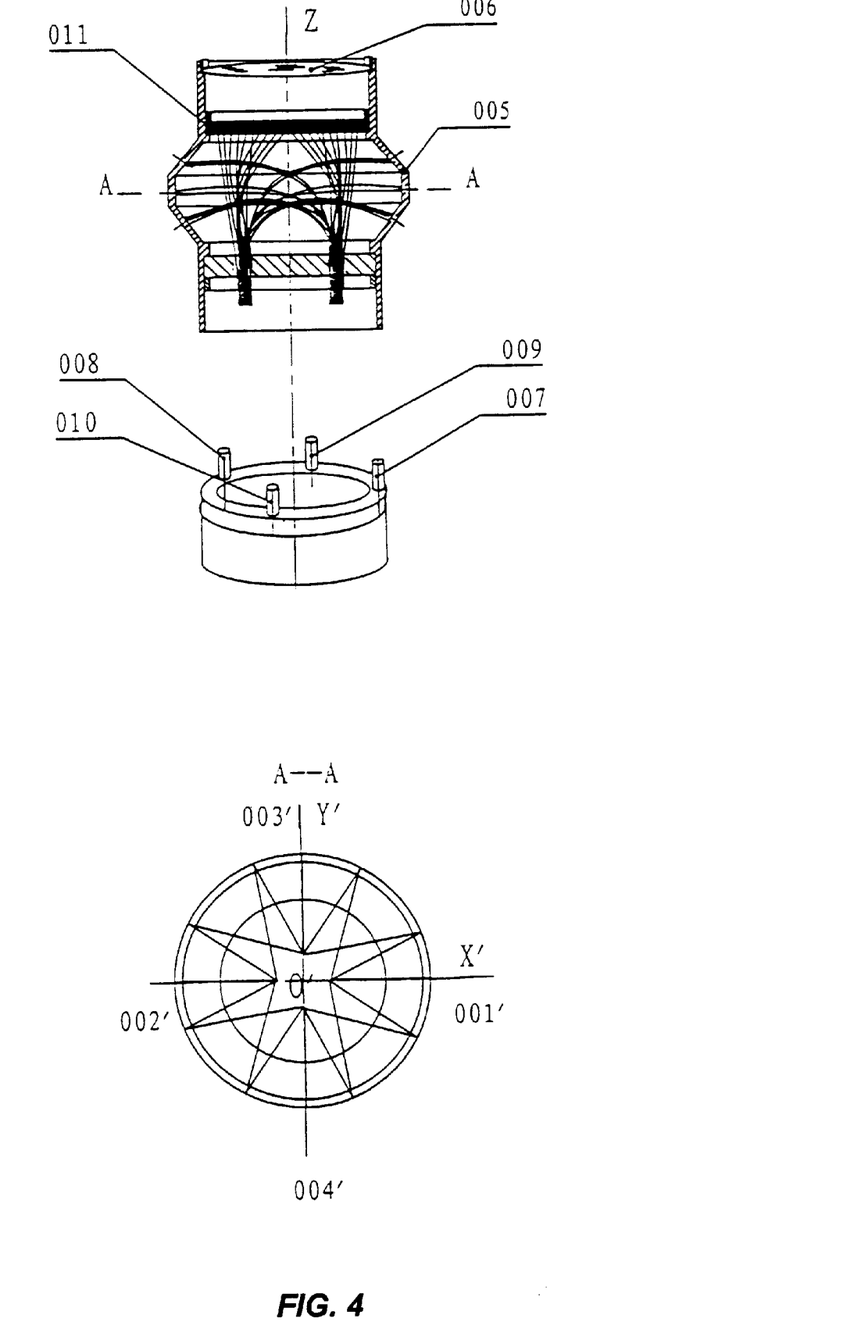
FIG. 4 is a schematic view showing the construction of the second embodiment of the sensor of the present invention.

This embodiment is an optimum embodiment of the present invention, the construction of which is shown in FIG. 4.

In FIG. 4, the fixing device 005 is a columnar body, with its central. axis as axis Z which is parallel with the central axis of the focusing collector. Inside the columnar body, there is an end face 011, i.e. the XOY plane. This end face is divided into four zones in the same way as Embodiment 1 of the present invention. In each quadrant, two portions of optical fiber bundles are provided as light sensing elements to form light signal input ends of the sensor. The light sensing faces of these elements can be arranged in the same construction as Embodiment 1 to form four light signal input ends (IN001–IN004). Above the end face 011, a focusing element 006 is provided to detect the direction of incident solar rays and concentrate light energy.

The lower sidewall of the columnar body of the fixing device 005 is divided into four zones 001', 002', 003' and 004'. The four zones are formed in such a way that with section A—A as the X'O'Y' plane, the four octants where X' is positive form zone 001', the four octants where X' is negative form zone 002', the four octants where Y' is positive form zone 003' and the four octants where Y' is negative form zone 004'. X' and Y' are parallel with the corresponding X and Y axes. Here, the light signal input ends are formed of optical fiber bundles used as light sensing elements, the end faces of which are fixed in the four zones in the peripheral wall of the fixing device to form light sensing faces. In each zone, a group of optical fiber bundles is regularly arranged, which receives light signal component in the direction of the coordinate axis in this zone. Hence, each group of optical fiber bundles forms an input end and a total of four such input ends (IN001'–IN004') are formed. Each octant preferably contains two portions of optical fiber bundles to be able to sense light signal components in the directions of the two coordinate axes. The four input ends (IN001–IN004) formed of optical fibers arranged in the end face XOY and the four input ends (IN001'–IN004') formed of optical fibers arranged in the peripheral wall are combined correspondingly in four directions, and the two input ends (e.g., IN001 and IN001' which sense the light signals in the same direction correspond to a group of light signal output ends which is coupled to a photosensitive element. In this way, four output signals are produced from the sensor. In each quadrant of the end face 011 and each octant of the peripheral wall of the fixing device, the light sensing faces are separately belonging and coexisting as said above.

This embodiment has functions of angle adjustment both in a large range and in a small range. It operates on the following principle. When the angle between the central axis Z of the sensor and the incident rays is large, the incident solar rays fall into an octant at the peripheral wall of the fixing device 005. In this octant, the two portions of optical fiber bundles as light sensing elements both receive the light signals, which are then transmitted to the feedback control circuits via two elements of the photosensitive elements (007–010) to drive the light focusing collector to rotate in the direction of reducing the angle between the incident solar rays and axis Z of the sensor till it becomes smaller, thus completing a large angle adjustment. At this time, the light spot formed by the solar rays through the focusing element 006 falls into one corresponding quadrant of the four disposed in the end face 011, and received by the light sensing faces of two portions of optical fiber bundles regularly arranged in the plane. The received light signals are guided by the optical fiber bundles through two groups of output ends and transmitted to the feedback control circuits via the photosensitive elements, and after comparison and amplification, the light focusing collector is driven to rotate until it is aligned with the incident rays. Now the light spot through the focusing element of the sensor falls at the intersection point O of axes X and Y.

This embodiment integrates sensors for; large and small range adjustment into one device capable of all-directional adjustment, and makes the sensor more compact by using optical fiber bundles as light sensing elements.

EMBODIMENT 3

Figure 5:
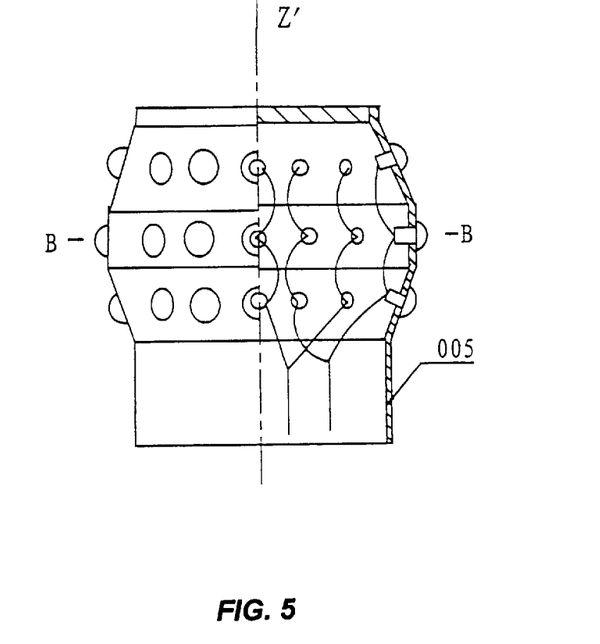
FIG. 5 is a schematic view showing the construction of the third embodiment of the sensor of the present invention.
Figure 6:
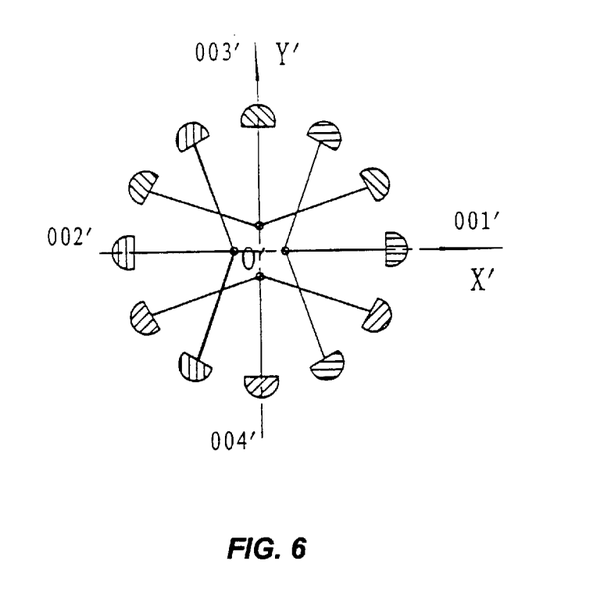
FIG. 6 is a schematic view showing the arrangement of light sensing elements in the third embodiment of the present invention.

This embodiment has only function of angle adjustment in a large range, the construction of which is shown in FIG. 5. This sensor comprises a columnar fixing device 005. The light input ends of the light signal receiver is formed of light sensing faces of photosensitive diodes. These diodes are arranged in four zones 001', 002', 063' and 004' in the sidewall of the fixing device 005 (FIG. 6). These four zones are formed in such a way that with the central axis of the columnar body as the axis Z' and plane B—B as the X'O'Y' plane, the four octants where X is positive form zone 001', the four octants where X' is negative form zone 002', the four octants where Y' is positive form zone 003' and the four octants where Y' is negative form zone 004'. The axis Z' of the sensor is parallel with the central axis of the focusing collector. The photosensitive diodes as light signal input ends are regularly arranged at three levels (upper, middle and lower) in these four zones, and the arrangement at each level is shown is FIG. 6. In each zone, a group of photosensitive diodes is disposed to receive the light signal component in the direction of one coordinate axis. Each group of photosensitive diodes corresponds to a group of light signal output ends. In total, there are four groups of output ends. Each octant contains two portions of photosensitive diodes which can receive the light signal components in the directions of two coordinate axes, namely, the photosensitive diodes are disposed in a separately-belonging and coexisting way.

EMBODIMENT 4

Figure 7:
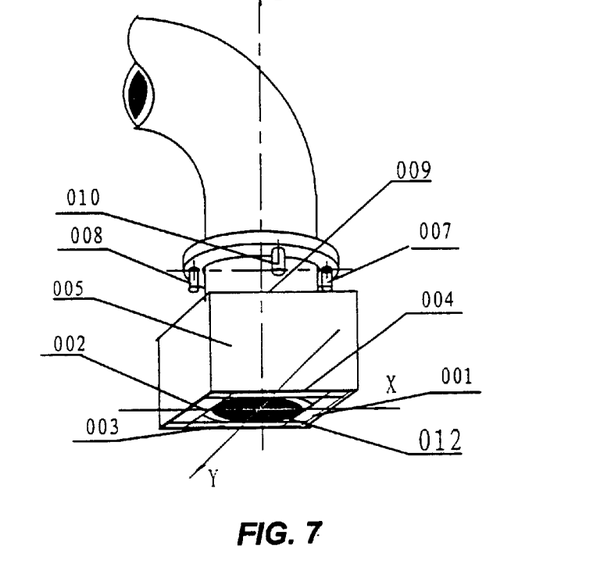
FIG. 7 is a schematic view showing the construction of the fourth embodiment of the sensor of the present invention.

This embodiment is another example of integrating sensors for large and small angle adjustment into one device, realized by adding a sensor for small angle adjustment as shown in FIG. 7 to the sensor in FIG. 5 for the large angle adjustment described in Embodiment 3. The sensor fixing device 005 of this embodiment sheathes the collecting head of the focusing collector, and its axis Z is parallel with the central axis of the focusing collector. The collecting head can be. an optical taper 012, and. its lower end face is fixed at the focal point of the focusing collector. Around the periphery of the end face of this optical taper, four zones 001, 002, 003 and 004 are formed in such a way that with the end face of the optical taper as the XOY plane consisting of four quadrants, the two quadrants where X is positive form zone 001, the two quadrants where X is negative form zone 002, the two quadrants where Y is positive form zone 003 and the two quadrants where Y is negative form zone 004. X and Y are parallel with the corresponding X' and Y' axes. The light sensing faces of the optical fiber bundles of the sensor for the small angle adjustment in this embodiment are arranged in these four zones, forming a closed ring around the periphery of the optical taper 012. The arrangement of optical fiber bundles is the same as Embodiment 1 of this invention. Namely, two portions of optical fiber bundles are regularly arranged in each quadrant to receive respectively the light signal components in the directions of two coordinate axes. With a group of optical fiber bundles in each zone forming an input end, a total of four input ends are formed. Furthermore, the input end in each direction of the sensor for a small angle adjustment is combined with the corresponding input end of the sensor for a large angle adjustment to correspond to a group of output ends to form an output signal. A total of four output signals are transmitted to the feedback control circuits.

This embodiment operates on the following principle. When the sensor for a large range adjustment adjusts the tracking to a right position, the incident solar rays form a small angle with the central axis of the sensor. The light spot formed by the reflected rays from the focusing collector gets into any one quadrant around they optical taper 012 at the focal point, and the light signals are received simultaneously by two portions of the light sensing faces of optical fiber bundles and transmitted to the feedback control circuits. After comparison and amplification, the focusing collector is driven to rotate until the light spot of the reflected rays from this focusing collector gets into the center of the end face of the optical taper at the focal point of the focusing collector to realize high accuracy sunlight tracking. Since the sensor of this embodiment is mounted around the collecting head of the focusing collector and the focusing collector itself acts as focusing element, the tracking accuracy is high.

EMBODIMENT 5

Figure 8:
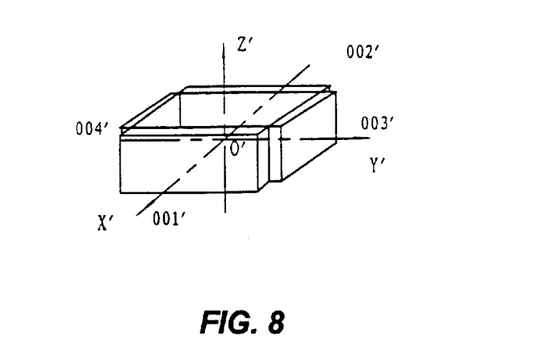
FIG. 8 is a schematic view showing the construction of the fifth embodiment of the sensor of the present invention.

This embodiment is a sensor for a large range adjustment, the construction of which is show in FIG. 8. In this embodiment, the fixing device for the light signal input ends is a hollow columnar body, the sidewall of which is divided into four zones 001', 002', 003' and 004' in such a way that with the central axis of this columnar body as the Z' axis and the plane in the middle of the body as X'O'Y' plane, the four octants where Y' is positive form zone 001', the four octants where X' is negative form zone 002', the four octants where Y' is positive form zone 003' and the four octants where Y' is negative form zone 004'. The light signal input ends are arranged in these four zones. In this embodiment, the light signal input ends are formed of the light sensing faces of four photocells fixed in the peripheral wall of the fixing device. Each sensing face can receive light signals in a range of 180° both vertically and horizontally. The photocell in each zone receives the light signal component in the direction of the coordinate axis in this zone, and the two photocells in each octant can receive the light signal components in the directions of the two coordinate axes. Each photocell is connected with a light signal output end, and thus four output ends are formed for the sensor.

Figure 9:
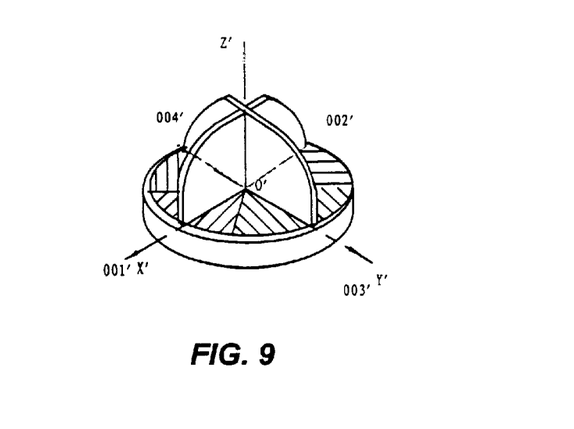
FIG. 9 is a schematic view showing the construction of the varied light sensing element in the fifth embodiment of the sensor of the present invention.

As a variation of light sensing elements in this embodiment, a photocell having four quadrants and provided with orthogonal reflecting plates can be used instead of four photocells. As shown in FIG. 9, one light sensing face belongs to two quadrants, and each quadrant contains two portions of two light sensing faces. Each light sensing face corresponds to a light output end. When solar rays radiate into a quadrant of the photocell, a part of the incident rays directly fall to two portions of light sensing faces of the quadrant, while the rest of the incident rays after being reflected by a reflecting plate also fall to this two portions of light sensing faces so that the light signals falling to this two portions of sensing faces are intensified.

This embodiment and its variation all use photocells directly as light sensing elements, which is simple in construction. The operating principle is that in case the angle between the Z' axis of the sensor and the incident rays is large, when the solar rays radiate into an octant at the peripheral wall of the fixing device, the light signals are received by the sensing faces of the photocells used as light sensing elements in this octant, and transmitted to the feedback control circuits for comparison and amplification, then the focusing collector is driven to rotate in the direction of reducing the angle between the solar rays and axis Z' of the sensor so as to fulfill the angle adjustment in large range.

EMBODIMENT 6

Figure 10:
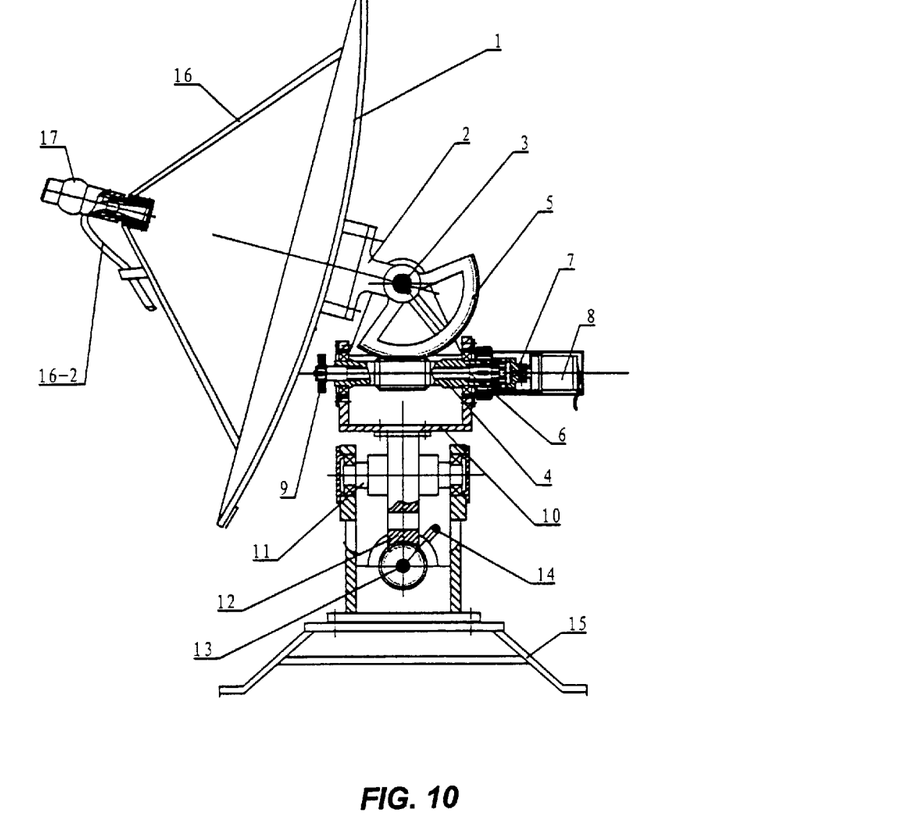
FIG. 10 is a schematic view showing the construction of the first embodiment of the fully automatic solar tracking and collecting device of the present invention.

This embodiment is a fully automatic solar tracking and collecting device applicable for illumination by using the sunlight tracking sensor of the present invention. As shown in FIG. 10, it comprises a focusing collector 1 in the form of a curved reflecting mirror, which is rotated by a mechanical drive and controlled by light signal feedback control circuits. By the action of the mechanical drive, this focusing collector 1 can be rotated around the axes of a main shaft 11 and an auxiliary shaft 3 which are in a cross position.

In this embodiment, the mechanical drive consists of a main shaft unit and an auxiliary shaft unit. The auxiliary shaft unit is mainly composed of an auxiliary shaft 3, a reversible motor 8, a wormwheel 5, a worm 4 and an auxiliary supporting frame 10. The auxiliary shaft 3 is connected with the holder 2 of the focusing collector and connected with the wormwheel 5 by keys. The worm 4 is supported by two bearings on the auxiliary supporting frame 10. The reversible motor 8 for the auxiliary shaft drives the worm 4 which in turn drives the wormwheel 5 to rotate. The main shaft unit is mainly composed of a main shaft 11, a wormwheel 12, a worm 13 and a reversible motor (not shown in FIG. 10). The wormwheel 12 is connected with the auxiliary supporting frame 10, and this auxiliary supporting frame 10, together with the light collector 1 on it, can rotate around the axis of the main shaft 11. By the rotation of the light collector around the main and auxiliary shafts, the purpose of sun tracking is fulfilled. The whole mechanical drive system is clear in principle, simple and compact in construction.

The above-mentioned reducer mechanism can be a type of gear reducer, planetary reducer or harmonic reducer, etc. Besides, in some particular cases, the main shaft and the auxiliary shaft can be rotated manually with the handwheels 14 and 9 for them respectively to make the collector track the sun.

Figure 11:
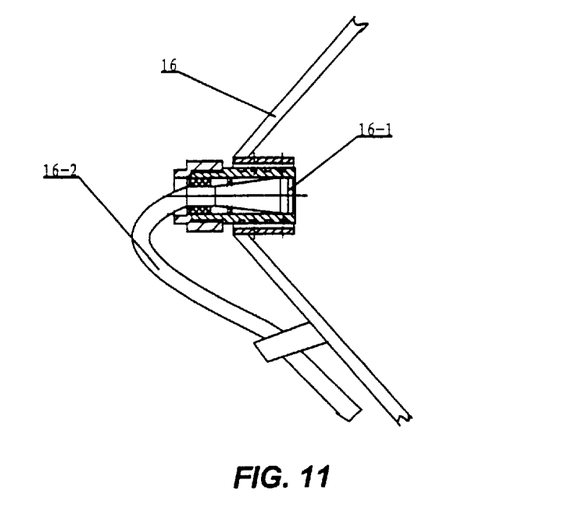
FIG. 11 is a schematic view showing the construction of the light collecting head in the first embodiment of the fully automatic solar tracking and collecting device of the present invention.

On the focusing collector 1, a support member 16 is provided to fix the collecting head at the focal point of the focusing collector 1. As shown in FIG. 11, the collecting head comprises a heat-insulating glass 16-1, at one end of which a polymer light guide 16-2 with an enlarged conical end is provided to transmit the sun light collected by the focusing collector to the place to be illuminated. In this embodiment, a sunlight tracking sensor 17 is provided on the collecting head. This sunlight tracking sensor can have a construction as shown in Embodiment 2 of the present invention, capable of angle adjustment both in large range. and in small range. The lower end of the fixing device of this sensor is connected with the upper end of the collecting head, i.e. mounted at the central axis of the focusing collector which is parallel with axis Z of the sensor. The auxiliary shaft is kept parallel with one of the coordinate axes X (or X') and Y (or Y') of the sensor. The operating principle of this sensor is the same as Embodiment 2. When the incident solar rays deviate from the central axis of the sensor to a large angle, the solar rays radiate into an octant at the peripheral wall of the fixing device of the sensor, and the two portions of optical fiber bundles used as light sensing elements in this octant receive the light signals. After the signals are compared and amplified by the feedback control circuits, the reversible motor (not shown) for the main shaft or the reversible motor 8 for the auxiliary shaft is driven to rotate the focusing collector 1 via the mechanical drive until the convergent light spot of solar rays through the focusing element enters the range of the sensor for a small angle adjustment. At this time, the light spot of solar rays focused by the focusing element gets into one of the four quadrants in the plane of end face of the sensor fixing device, and the light signals are received by the two portions of optical fibers used as light sensing elements in this quadrant and transmitted to the feedback control circuits to make the reversible motor for the main shaft or the reversible motor for the auxiliary shaft to operate until the central axis of the sensor becomes parallel with the incident solar rays so as to realize automatic tracking and collecting of sunlight.

EMBODIMENT 7

Figure 12:
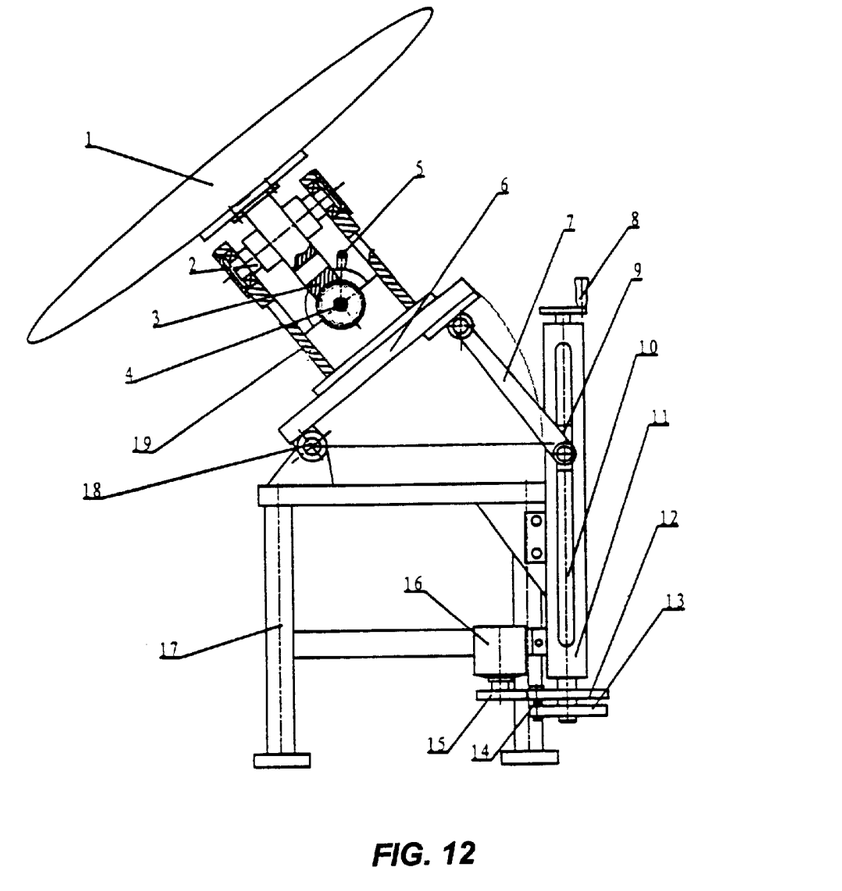
FIG. 12 is a schematic view showing the construction of the second embodiment of the fully automatic solar tracking and collecting device of the present invention.

This embodiment is also a fully automatic solar tracking and collecting device applicable for illumination by using the sunlight tracking sensor of the present invention, the construction of which is shown in FIG. 12. The fully automatic solar tracking and collecting device in this embodiment is mainly composed of a focusing collector, a mechanical drive for rotating the focusing collector, two sets of light signal feedback control circuits for controlling the mechanical drive, and a sunlight tracking sensor. In this embodiment, the focusing collector is in the form of a curved reflecting mirror 1, on which an aluminum reflecting layer for improving reflection efficiency is plated. The curved reflecting mirror 1 can adjust the altitude angle and azimuth angle toward the sun by rotating around the main shaft 18 and the auxiliary shaft 2 to make its central axis directed at any direction. At the position of the axial convergent light spot of the curved reflecting mirror 1, an optical taper (not shown) as the collecting head is provided. The lower end face of the optical taper is coincided with the focal point of the focusing collector, and its upper end is coupled with an optical fiber bundle or a light guide. The optical taper arranged in this way can improve the focusing capacity as well as isolate heat. The focusing collector can be made of either metal material (e.g. steel or aluminum) or nonmetal material (e.g. glass, plastic or composite material). The optic surface of the focusing collector can be furnished by one of following methods: (1) direct use of a mirror material, (2) direct polish of the base material, (3) adhesion of a reflecting film on the base material, (4) coating or sputtering of a reflecting material on the base material. The optical fiber bundle or light guide for illumination can be compound glass optical fiber bundle, silica optical fiber bundle, polymer light guide or liquid-core light guide.

The mechanical drive for rotating the focusing collector comprises a main shaft unit for adjusting the altitude angle toward the sun and an auxiliary shaft unit for adjusting the azimuth angle. The main shaft unit is mainly composed of a motor 16, a main shaft 18, a support plate 6, a ;pulling rod 7, a screw arbor 10, a sleeve 11, a nut 9 and gears 13, 14 and 15. The support plate 6 is hinged on the base frame 17 via the main shaft 18, and is able to rotate around the main shaft 18. One end of the pulling rod 9 is hinged with the support plate 6, and the other is hinged with the nut 9. The gear 15 is connected with the output shaft of the motor, and the gear 14 is loosely slipped on the screw arbor 10 and connected by pin with the gear 13 secured on the screw arbor 10. The motor 16 drives the gear 15 to make the nut 9 move up and down along the screw arbor 10 in the sleeve 11. The linear movement of the nut 9 gives rise to the circumferential movement of the plate 6 so as to adjust the altitude angle of the collector toward the sun correspondingly. The auxiliary shaft unit is mainly composed of an auxiliary shaft 2, a motor, a wormwheel 3, a worm 4 and an auxiliary supporting frame 19. The auxiliary shaft is kept parallel with one of the coordinate axes X (or X') and Y (or Y') of the sensor. The motor drives the paired wormwheel and worm to rotate the light collector around the auxiliary shaft.

In this embodiment, the sunlight tracking sensors for large and small angle adjustment can be constructed in the same way as Embodiment 4 of the present invention. Namely, the optical fiber bundles as light sensing elements in the sensor for a small angle adjustment can be disposed in four quadrants around the periphery of the optical taper used as a light collecting head, while the photosensitive diodes as light sensing elements in the sensor for a large angle adjustment are disposed in eight octants at the peripheral wall of the columnar fixing device of the sensor. Axis Z is parallel with the central axis of the focusing collector.

In the operation of the fully automatic solar tracking and collecting device of this embodiment, the sensor for a small angle adjustment provided around the optical taper 12 is used to sense small angle between the central axis of the sensor and the incident solar rays in a range of 0~α degree, and the sensor for big angle adjustment is used to sense big angle from α/2 degree on. To ensure the receiving of light signals in all directions without any dead zone, a coinciding zone between the angle ranges detected by both sensors for large and small angle adjustment is needed. When the angle between solar rays and axis Z is large, the sunlight signals received by the sensor for a large angle adjustment is transmitted to the feedback control circuit set to actuate the corresponding motor to rotate the curved reflecting mirror 1 until the angle between the incident solar rays and axis Z gets into the coinciding zone, and at this time, the optical fiber bundles used as light sensing elements of the sensor for the small angle adjustment receive the light signal and actuate the motor to continue the operation until the focusing collector is aligned with the incident solar rays so that high accuracy sunlight tracking is realized.

Figure 13:
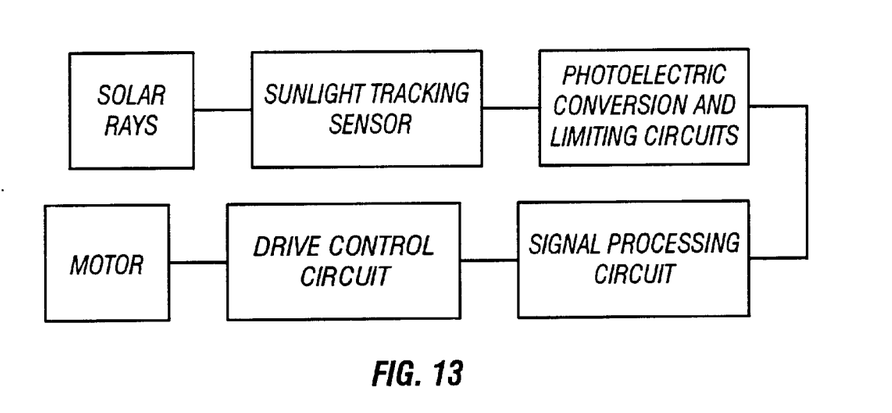
FIG. 13 is a block diagram showing the principle of the light signal feedback control circuit set of the present invention.
Figure 14:
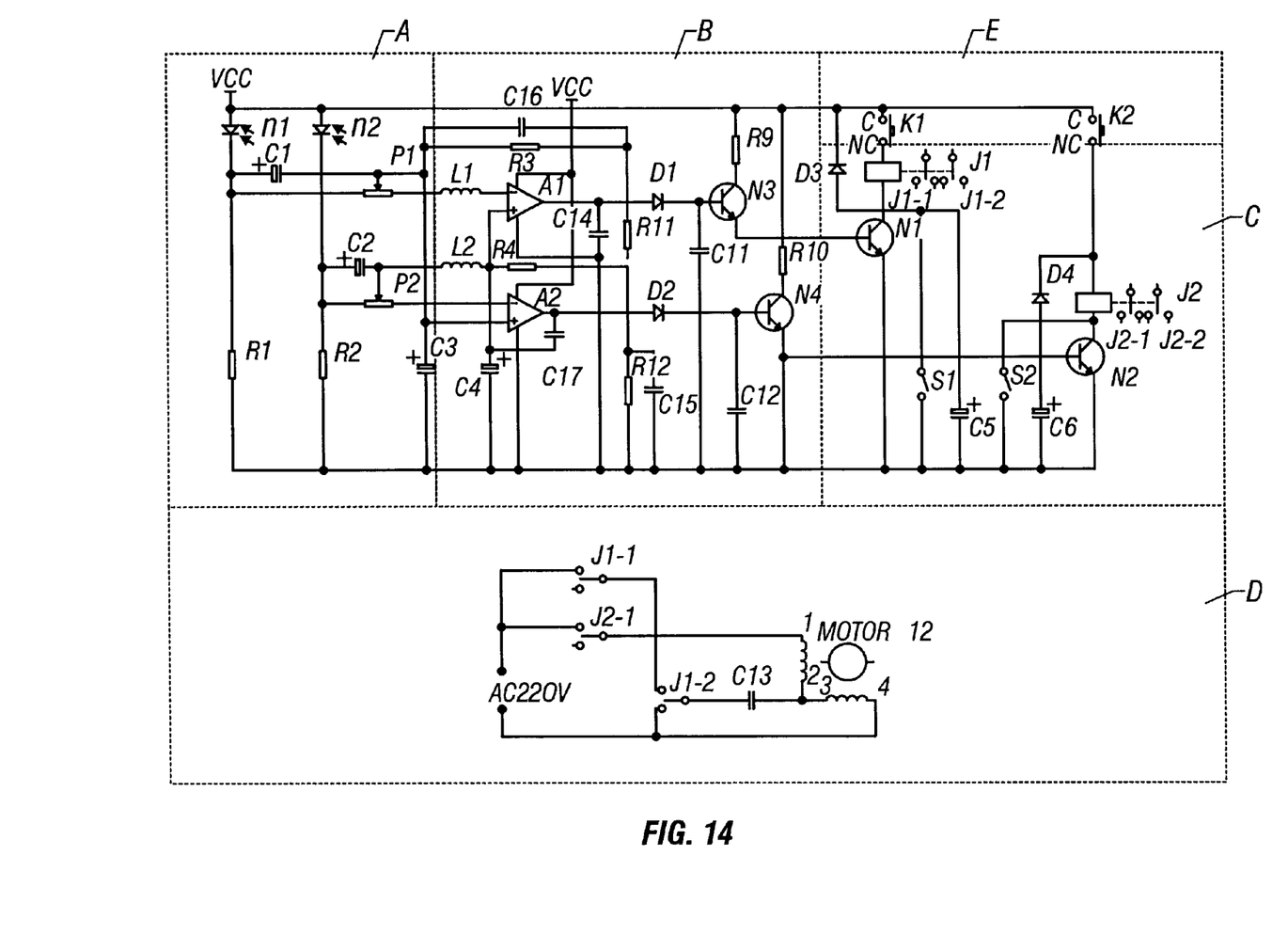
FIG. 14 is an embodiment of the feedback control circuit set of the present invention.

FIG. 13 indicates the principle of the feedback control circuit set of fully automatic solar tracking and collecting device of the present invention, and FIG. 14 shows an example of the feedback control circuit set for the invention. The light signal feedback control circuit set is mainly composed of a light signal receiving and conversion circuit, a signal processing circuit, a drive control circuit and a limiting circuit. The: signal processing circuit can be a type of single-chip microprocessor circuit, PLC circuit, differential circuit or switching circuit. Of these circuits, the light signal receiving and conversion circuit and the limiting circuit as input portion are connected with the signal processing circuit, and the drive control circuit as output portion is connected with the signal processing circuit. The output ends of the drive control circuit are connected respectively with the motors for the main shaft and for the auxiliary shaft.

In addition to the above-described embodiments, the sunlight tracking sensor of the present invention and its application can be embodied in many forms. Any other embodiment adopting the principle of this sensor and any other equivalent variation of the light collecting device are within the scope of protection by the present invention.

What is claimed is:

1. A sunlight tracking sensor comprising a light signal receiver comprising input and output ends and a fixing device, with an axis Z as its central axis, the light signal receiver configured to align said axis Z substantially parallel to an incident sunlight, the light input ends of the light signal receiver being formed of light sensing elements and the output ends respectively connected with corresponding control circuits, wherein light sensing faces of the light sensing elements of said light signal receiver are distributed in four quadrants of an end face as an XOY plane of the fixing device to form a closed ring; the output ends of the light signal receiver can be set in four groups, corresponding to which, four groups of light sensing faces of the light sensing elements are respectively distributed in four zones: the two quadrants where X is positive (001), the two quadrants where X is negative (002), the two quadrants where Y is positive (003) and the two quadrants where Y is negative (004); the four groups of light sensing faces in the four zones respectively sense the light signal components in the directions of the coordinate axes in the corresponding zones; the light sensing faces arranged in each quadrant include two groups of light sensing faces contained in two zones; and the light sensing faces face a light focusing element.

2. A sunlight tracking sensor according to claim 1, wherein that the light sensing faces of the light sensing elements of the light signal receiver can be arranged in the peripheral wall of the fixing device in eight octants of the 3D space formed by orthogonal axes X', Y' and Z'; the output ends of the light signal receiver can be set in four groups, corresponding to which four groups of light sensing faces of the light sensing elements are respectively distributed in four zones: the four octants where X' is positive (001'), the four octants where X' is negative (002'), the, four octants where Y' is positive (003') and the four octants where Y' is negative (004'); the, four groups of light sensing faces in four zones respectively sense the light signal components in the directions of the coordinate axes in the corresponding zones; and the light sensing faces arranged in each octant include two groups of light sensing faces contained in two zones.

3. A sunlight tracking sensor according to claim 1 or 2, wherein the light sensing faces of a set of light sensing elements of the light signal receiver are arranged in the XOY plane of the fixing device according to said four quadrants, while the light sensing faces of the other set of light sensing elements of the light signal receiver are arranged in the peripheral wall of the fixing device according to said eight octants of the 3D space formed by orthogonal axes X', Y' and Z', with the X' and Y' axes parallel to the corresponding X and Y axes; and two corresponding groups of light sensing faces which sense light signals in the same direction are combined to correspond to one group of output ends and the sensor have four groups of such output ends in total.

4. A sunlight tracking sensor according to claim 3, wherein the light sensing elements of the light signal receiver are optical fiber bundles, the output ends of which are coupled with photosensitive elements.

5. A sunlight tracking sensor according to claim 3 wherein that the light sensing elements of the light signal receiver are photosensitive elements.

6. A fully automatic solar tracking and collecting device using the sunlight tracking sensor according to claim 1 or 2, comprising a focusing collector which is rotated by a mechanical drive and controlled by light signal feedback control circuits, wherein said focusing collector is rotated around the axes of two crossing shafts, a main shaft and an auxiliary shaft; on the focusing collector a sunlight tracking sensor is provided, which comprises a light signal receiver and its fixing device, the light input ends of said light signal receiver being formed of light sensing elements, and axis Z being a central axis of the fixing device; the sensing faces of a set of light sensing elements of the light signal receiver are arranged in the XOY plane of the fixing device according to said quadrants; the sensing faces of the other set of light sensing elements of the light signal receiver are arranged in the peripheral wall of the fixing device according to said eight octants of the 3D space formed by orthogonal axes X', Y' and Z', with the X and Y axes being parallel with the corresponding X' and Y'axes, axis Z of the sensor parallels with the central axis of the focusing collector; the output ends of the light signal receiver can be set in four groups which are respectively connected with corresponding control circuits; the auxiliary shaft is kept parallel with one of the coordinate axes X' (or X) and Y' (or Y) of the sensor; and when the convergent light spot through the focusing element of the sensor falls just at the intersection point O between axes X and Y, the focusing collector is just directed at the sun.

7. A fully automatic solar tracking and collecting device according to claim 6, wherein said focusing collector is provided with a collecting head at the focusing position in its central axis, one end of said collecting head directed at the focused solar rays and the other end coupled with the input end of an optical fiber bundle or a light guide to transmit the light to the area to be illuminated.

8. A fully automatic solar tracking and collecting device according to claim 6, wherein the light sensing faces of the light sensing elements of said light signal receiver are arranged in four quadrants in the plane XOY of the end face of the light collecting head to form a closed ring; the output ends of the light signal receiver can be set in four groups, corresponding to which four groups of light sensing faces of the light sensing elements are respectively distributed in four zones: the two quadrants where X is positive (001), the two quadrants where X is negative (002), the two quadrants where Y is positive (003) and the two quadrants where Y is negative (004); the four groups of light sensing faces in four zones respectively sense the light signal components in the directions of coordinate axes in the corresponding zones; the light sensing faces arranged in each quadrant include two groups of light sensing faces contained in two zones; and the focusing collector itself acts as a focusing element.

9. A fully automatic solar tracking and collecting device according to claim 6, wherein the sunlight tracking sensor can be mounted coaxially with the light collecting head.

10. A fully automatic solar tracking and collecting device according to claim 6, wherein said light collecting head includes an optical taper.

11. A fully automatic solar tracking and collecting device according to claim 6, wherein said light collecting head includes a heat-insulating glass and an optical fiber bundle or a light guide, and said fiber bundle or light guide further including an enlarged conical end.

12. A fully automatic solar tracking and collecting device according to claim 6, wherein said mechanical drive comprises a main shaft unit and an auxiliary shaft unit, the main shaft unit includes a main shaft, a reversible motor and a reducer for the main shaft and the auxiliary shaft unit composed of an auxiliary shaft, a reversible motor and a reducer for the auxiliary shaft; said main shaft and its reversible motor and reducer are all mounted on a base frame; said reversible motor and reducer for the auxiliary shaft are mounted on a n auxiliary supporting frame; said auxiliary shaft is connected with the holder of the focusing collector and supported by two bearings on the auxiliary supporting frame; said holder is connected with the focusing collector; the auxiliary supporting frame is connected with the main shaft; and the two reversible motors respectively drive the main shaft and the auxiliary shaft via their reducers.

13. A fully automatic solar tracking and collecting device according to claim 6, wherein light signal feedback control circuit set includes a light signal receiving and conversion circuit, a signal processing circuit, a drive control circuit and a limiting circuit; the signal processing circuit includes a type of single-chip microprocessor circuit, PLC circuit, differential circuit or switching circuit; the light signal receiving and conversion circuit and the limiting circuit as input portion are connected with the signal processing circuit, and the drive control circuit as output portion is connected with the signal processing circuit; the output ends of the drive control circuit are connected respectively with the main shaft motor and the auxiliary shaft motor.

14. A fully automatic solar tracking and collecting device according to claim 6, wherein said optical fiber bundle or light guide includes compound-glass optical fiber bundle, silica optical fiber bundle, polymer light guide or liquid-core light guide.

15. A fully automatic solar tracking and collecting device according to claim 6, wherein said focusing collector includes one of following base materials: (1) metal steel, aluminum, (2) nonmetal—glass, plastic, composite material; the optic surface of said focusing collector can be furnished by one of following methods: (1) direct use of a mirror material, (2) direct polish of the base material, (3) adhesion of a reflecting film on the base material, (4) coating or sputtering of a reflecting material on the base material.

16. A fully automatic solar tracking and collecting device using the sunlight tracking sensor according to claim 3, comprising a focusing collector which is rotated by a mechanical drive and controlled by light signal feedback control circuits, wherein said focusing collector is rotated around the axes of two crossing shafts, a main shaft and an auxiliary shaft; on the focusing collector a sunlight tracking sensor is provided, which comprises a light signal receiver and its fixing device, the light input ends of said light signal receiver being formed of light sensing elements, and axis Z being a central axis of the fixing device; the sensing faces of a set of light sensing elements of the light signal receiver are arranged in the XOY plane of the fixing device according to said quadrants; the sensing faces of the other set of light sensing elements of the light signal receiver are arranged in the peripheral wall of the fixing device according to said eight octants of the 3D space formed by orthogonal axes X', Y' and Z', with the X and Y axes being parallel with the corresponding X' and Y' axes, axis Z of the sensor parallels with the central axis of the focusing collector; the output ends of the light signal receiver can be set in four groups which are respectively connected with corresponding control circuits; the auxiliary shaft is kept parallel with one of the coordinate axes X' (or X) and Y' (or Y) of the sensor; and when the convergent light spot through the focusing element of the sensor falls just at the intersection point O between axes X and Y, the focusing collector is just directed at the sun.

17. A fully automatic solar tracking and collecting device according to claim 16, wherein said focusing collector is provided with a collected head at the focusing position in its central axis, one end of said collecting head directed at the focused solar rays and the other end coupled with the input end of an optical fiber bundle or a light guide to transmit the light to the area to be illuminated.

18. A fully automatic solar tracking and collecting device according to claim 16, wherein the light sensing faces of the light sensing elements of said light signal receiver are arranged in four quadrants in the plane XOY of the end face of the light collecting head to form a closed ring; the output ends of the light signal receiver can be set in four groups, corresponding to which four groups of light sensing faces of the light sensing elements are respectively distributed in four zones: the two quadrants where X is positive (001), the two quadrants where X is negative (002), the two quadrants where Y is positive (003) and the two quadrants where Y is negative (004); the four groups of light sensing faces in four zones respectively sense the light signal components in the directions of coordinate axes in the corresponding zones; the light sensing faces arranged in each quadrant include two groups of light sensing faces contained in two zones; and the focusing collector itself acts as a focusing element.

19. A fully automatic solar tracking and collecting device according to claim 16, wherein the sunlight tracking sensor can be mounted coaxially with the light collecting head.

20. A fully automatic solar tracking and collecting device according to claim 16, wherein said light collecting head includes an optical taper.

21. A fully automatic solar tracking and collecting device according to claim 16, wherein said light collecting head includes a heat-insulating glass and an optical fiber bundle or a light guide, and said fiber bundle or light guide further including an enlardged conical end.

22. A fully automatic solar tracking and collecting device according to claim 16, wherein said mechanical drive comprises a main shaft unit and an auxiliary shaft unit, the main shaft unit includes a main shaft, a reversible motor and a reducer for the main shaft and the auxiliary shaft; said main shaft and its reversible motor and reducer are all mounted on a base frame; said reversible motor and reducer for the auxiliary shaft are mounted on an auxiliary supporting frace; said auxiliary shaft is connected with the holder of the focusing collector and supported by two bearings on the auxiliary supporting frame; said holder is connected with the focusing collector; the auxiliary supporting frame is connected with the main shaft; and the two reversible motors respectively drive the main shaft and the auxiliary shaft via their reducers.

23. A fully automatic solar tracking and collecting device according to claim 16, wherein light signal feedback control circuit set includes a light signal receiving and conversion circuit, a signal processing circuit, a drive control circuit and a limiting circuit; the signal processing circuit includes a type of single-chip microprocessor circuit, PLC circuit, differential circuit or switching circuit; the light signal receiving and conversion circuit and the limiting circuit as input portion are connected with the signal processing circuit, and the drive control circuit as output portion is connected with the signal processing circuit; the output ends of the drive control circuit are connected respectively with the main shaft motor and the auxiliary shaft motor.

24. A fully automatic solar tracking and collecting device according to claim 16, wherein said optical fiber bundle or light guide includes compound-glass optical fiber bundle, silica optical fiber bundle, polymer light guide or liquid-core light guide.

25. A fully automatic solar tracking and collecting device according to claim 16, wherein said focusing collector includes one of following base materials: (1) metal steel, aluminum, (2) nonmetal –glass, plastic, composite material; the optic surface of said focusing collector can be furnished by one of following methods: (1) direct use of a mirror material, (2) direct polish of the base material, (3) adhesion of a reflecting film on the base material, (4) coating or sputtering of a reflecting material on the base material.

\* \* \* \* \*